(12) United States Patent
Burczynski (10) Patent No.: US 6,739,085 B1
(45) Date of Patent: May 25, 2004

(54) FISH HOOK

(75) Inventor: Michael J. Burczynski, Horseheads, NY (US)

(73) Assignee: Sparrowhawk Research LLC, Boise, ID (US)

( * ) Notice: Subject to any disclaimer, the term of this patent is extended or adjusted under 35 U.S.C. 154(b) by 0 days.

(21) Appl. No.: 10/379,833

(22) Filed: Mar. 4, 2003

(51) Int. Cl.⁷ ............................................... A01K 83/00
(52) U.S. Cl. ...................................... 43/43.16; 43/43.4
(58) Field of Search ................................. 43/43.16, 43.4

(56) References Cited

U.S. PATENT DOCUMENTS

| | | | | | |
|---|---|---|---|---|---|
| 2,501,210 A | * | 3/1950 | Cretin | ........................ | 43/43.16 |
| 2,611,986 A | * | 9/1952 | Silva | .......................... | 43/42.28 |
| 2,789,388 A | * | 4/1957 | Freitas | ....................... | 43/43.16 |
| 2,796,605 A | * | 6/1957 | Ashley | ........................ | 43/26.2 |
| 2,815,603 A | * | 12/1957 | Bandemer | .................. | 43/43.16 |
| 2,911,752 A | * | 11/1959 | Paul | ........................... | 43/42.28 |
| 2,984,041 A | * | 5/1961 | Banker | ....................... | 43/43.16 |
| 3,027,677 A | * | 4/1962 | James | ........................ | 43/44.82 |
| 3,397,477 A | * | 8/1968 | Hand | ............................ | 43/15 |
| 3,755,954 A | * | 9/1973 | Lucius | ....................... | 43/43.16 |
| 3,827,174 A | * | 8/1974 | Banker | ....................... | 43/43.16 |
| 4,126,957 A | * | 11/1978 | Randall | ...................... | 43/43.16 |
| 4,841,666 A | * | 6/1989 | Dallas | ........................ | 43/43.16 |
| 4,858,371 A | * | 8/1989 | Preiser | ....................... | 43/43.16 |
| 5,884,428 A | * | 3/1999 | Shelton | ........................ | 43/4.5 |
| 6,560,916 B1 | * | 5/2003 | Maxim | ....................... | 43/43.16 |

* cited by examiner

*Primary Examiner*—Peter M. Poon
*Assistant Examiner*—Joan M. Olszewski
(74) *Attorney, Agent, or Firm*—Christopher R. Pastel; Hancock & Estabrook, LLP (57) ABSTRACT

A quick-release fish hook enables an angler to one-handedly release a fish caught on the hook without dangerous hand exposure to sharp fish teeth or the hook itself. A forward hook shank portion with an interior channel is connected to a slotted rear shank portion extending obliquely from the rear end of the forward hook shank portion. A generally U-shaped hook member with a sharp tip and an opposed locking notch is rotatively attached in the slot in the rear shank portion by a swivel pin which is displaced from the axis of the forward hook shank portion. A lock rod rides in the interior channel and is rearwardly spring-biased at all times to be disposed in the locking notch. The hook is released by pulling a distal button connected to the lock rod to retract the lock rod from the notch. A cam surface is adjacent the locking notch and forces retraction of the lock rod from an extended position and into the interior channel when the unlocked hook member is rotated. Further rotation enables the biased lock rod to snap into the locking notch to lock the hook for angling.

30 Claims, 7 Drawing Sheets

FISH HOOK

BACKGROUND OF THE INVENTION

1. Field of the Invention

The invention relates to apparatus for catching fish. More particularly, the invention pertains to apparatus for quickly releasing a fish from a hook without contact with the fish.

2. State of the Art

Recreational fishing is a pastime which is very popular throughout the world, and is typically conducted by enticing a fish to strike at or consume a live bait or artificial lure and become caught on a hook. Hook sizes vary from the very smallest e.g. size 28 for catching small fish and/or imitating tiny natural insects, etc., to large hooks useful for catching large saltwater fish such as sailfish, sharks, tuna, etc. Fish hooks are generally formed from wire to provide a bent lower end with a fish-holding barb, an attachment eye at the upper end, and a straight or arcuate intermediate shank. Many fish hook designs exist in the art, and are generally distinguished by differences in hook profile, cross-sectional thickness, shank length and other features. Each style is adapted to a specific type of lure, a specific fish species, or fishing a specific type of water body. Some of the more popular hook types include Aberdeen hooks, egg hooks, bait hooks, fly hooks, O'Shaughnessy hooks, jig hooks, octopus hooks, and plastic worm hooks. As well-known in the art, the hook or hook-carrying lure is attached at its eye to a fish line wound on a reel. The reel is attached to a flexible rod enabling an angler to place the hook or lure in a desired area of a water body and manipulate the hook/lure.

In the past four decades, the concept of "catch and release" has become popular, by which fish caught by an angler are immediately released to the water body, enabling enhanced fishing "quality", defined by increased numbers and sizes of fish. Governmental fishing regulations often require release of fish based on species, fish size, and the particular water body being fished. Recently, fishing tournaments have become popular, in which anglers attempt to catch the largest fish or greatest poundage of fish of a given species. Typically, the rules require return of all fish to the water immediately after weighing. Often, fish of another species may be caught, and it is desirable to quickly release the fish and continue fishing.

Unfortunately, in each of these situations, removal of a fish from a conventional hook often leads to death of the fish. It is often necessary to lift the fish from the water to unhook the fish, such handling causing disruption of the external protective layer and/or causing internal injury. Alternatively, the line may simply be cut, and the fish may subsequently die from infection, difficulty with eating or entanglement of the cut line. Line cutting also results in loss of lure as well as line, and requires attachment of a new lure to the line, or even replacement of the line on the fishing reel. Thus, there is a significant loss of effective fishing time as well as a financial loss. Such losses are particularly disadvantageous in tournament competition.

Various methods and apparatus have been proposed for improving the survival rate of fish upon release. For example, hooks have been fabricated from materials which corrode rapidly, eventually releasing a lure whose hooks are embedded in the mouth of a released fish. However, when used repeatedly for fishing in a salt water environment, the hooks become weakened.

It has been recognized that rapid release from a hook without significant handling of the hooked fish out of water is important for fish survival. Thus, fish-releaseable hooks have been proposed by several patentees, as noted in the following brief discussion.

In U.S. Pat. Nos. 2,823,486 of Behee and 3,027,676 of Buttemeier, a relatively heavy cable or string has one end attached to the underside of the hook bend, and the other end tied to a leader or fishing line above the hook. With a hooked fish, pulling on the string is said to invert the hook and allow the fish to be unhooked. However, it is apparent that pulling of the cable may actually drive the barbed hook deeper into the fish, inasmuch as the hook's eye will press against the fish's mouth and prevent full rotation. Rotational force will not occur at all unless the force on the cable exceeds the force exerted by the fish on the leader. It will be exceedingly difficult or impossible (even dangerous) for a person to support the weight or exerted force of a large fish by pulling on a slender, wet and slippery cable. "Rope-burning" or even severing of an angler's hand or fingers may occur. An angler's hand may become wedged between the cable and fishline/leader, leading to injury. Use by children, some women and disabled persons is obviated, even when fishing for relatively small fish, i.e. less than about 1–3 pounds. Furthermore, the free-floating cable is likely to become entangled with weeds, underwater branches, mud or other obstacles, rendering the system inoperable or causing loss thereof. Entanglement of the cable following hooking of a fish may invert the hook and cause release before the angler can retrieve the fish, thus negating the purpose of the device. The devices of Behee and Buttemejer appear to be applicable to bait fishing rather than artificial lure fishing, since the cable will interfere with use in a lure such as a fly, plug, plastic worm, and the like. Live bait is often swallowed entirely by a fish. The non-working cable system may require use of a long pliers, or slitting the fish, to retrieve the hook and bait. The result of either method is reduction or complete lack of fish survival.

In U.S. Pat. Nos. 2,789,388 of Freitas and 2,911,752 of Leppich, lures which incorporate releasable hooks are shown which have similar features. The hooking members of both patents are shown as being barbless, and extend mostly in a lateral direction rather than in the line direction. Thus, the hook members do not effectively hold the fish on the line. As a fish moves, the line pressure on the lure changes direction and may actually prevent the hook members from puncturing the fish's mouth. Loss of the fish is likely to occur. Deliberate release of a fish requires an angler to pull a knob on the lure. Inasmuch as the front of the lure is generally within or protruding from a striking fish's mouth, release requiring the placement of an angler's fingers in or proximate the mouth subjects the fingers to dangerous sharp teeth.

In U.S. Pat. No. 3,755,954 of Lucius, another releaseable hook is shown which requires insertion of an angler's finger into or proximate to a fish's mouth to effect release of a fish. Because of the proximity of rotational axis to the release detent, however, the hook member will not rotate sufficiently to move the barbed end to a downwardly directed orientation. Thus, full release is unlikely to occur.

In U.S. Pat. No. 2,501,210 of Cretin, a fish-releaseable fish hook is shown which includes a barbed hook member which rotates about the rear end of a linear shank. The Cretin hook apparatus has a spring-loaded locking device which is activated by pulling a spring-loaded cable away from the hook to retract a pronged bolt, releasing the hooking member. To reset the hooking member for further fishing, an angler must simultaneously maintain the cable in a tensioned position relative the hook shank while manipulating the hooking member to a position in which a loop thereon is precisely aligned with the prong. While maintaining the positions of loop and prong, the cable is then released to allow the prong to enter the loop, resetting the hook. Thus, setting of the Cretin hook requires simultaneous use of a plurality of fingers on both hands. In practice, hook resetting is difficult to achieve because of the precise coordinated actions which are required. Inclement or cold weather conditions, boat movement and other conditions further add to the difficulty in hook resetting.

In the following description, an instantly releaseable fish hook is presented which overcomes problems of prior art releaseable fish hook devices.

SUMMARY OF THE INVENTION

The instant invention comprises a fish hook which enables instantaneous controllable release of a fish without touching the hook or lure body. The fish hook has an integral two-part shank whose forward portion is substantially linear. A rear portion of the shank comprises a pair of tines which project outwardly from the forward portion with a swivel pin connecting their outer ends. A generally U-shaped hook member has a sharp fish-catching end and an opposed locking end which extends to a rear part of the forward shank portion. The hook member is rotatably mounted on the swivel pin in an intermediate location of the hook member, and the locking end is movable in the inter-tine slot between the tines. A lock rod is axially movable in a channel within the forward shank portion, and is constantly spring-biased toward the rear end thereof, where it is movable into a locking notch in the hook member's locking end. A lock/unlock assembly includes a ripcord extending from the lock rod forwardly to a remote release button enabling an angler to release the hook by finger pressure without close encounter with a fish's teeth or sharp snout, etc. When released, the hook member swivels by up to about 180 degrees, releasing it from the fish's mouth. The hook member may be then re-locked by rotation until a cam surface pushes the rearwardly-biased lock rod forwardly into the shank channel, where an additional rotation enables the lock rod to snap into the locking notch. The fish hook is adaptable to a variety of hook shapes (both conventional and unconventional) and sizes, and may be used in many types of lures, including single/dual/triple hook rigs, plugs, spinners baits, spoons, and the like.

Among the controllable variables in the manufacture of the fish hook are the following:
1. size of the hook.
2. style of hook (i.e. shape).
3. spring compression for locking.
4. distance from hook/lure to remote release button.
5. displacement distance from swivel point to shank axis.
6. materials of construction.
7. lure type in which hook is incorporated.
8. type of attachment to a fishing line.

The quick-release fish hook of the invention enables fish to be released with minimal or no physical damage. The release is positively controlled by the angler in a manner which avoids contact with a fish's teeth, snout or other dangerous appendage. The release is effected by the use of one or more fingers on one hand.

In addition, the hook may be locked from an unlocked state very easily and quickly. No manual alignment of parts is required; locking only requires rotation of the hook member relative to the shank until locking occurs. The hook member cannot be over-rotated past a locking point.

BRIEF DESCRIPTION OF THE DRAWINGS

The features and advantages of the present invention can be more readily understood with reference to the following description and appended claims when taken in conjunction with the accompanying drawings, wherein:

DETAILED DESCRIPTION OF THE ILLUSTRATED EMBODIMENTS

As shown in FIGS. 1, 2, 3, 4, 5 and 6, an exemplary embodiment of a quick-release fish hook apparatus 10 of the invention comprises a shank 12 with a generally linear forward portion 14 and a rear portion 16. The forward portion 14 is shown as having a central axis 22 extending from the front end 24 to the rear end 26 thereof. The front end 24 terminates in an attached cap 30. The rear portion 16 of shank 12 is shown as extending at an oblique angle 38 from the rear end 26 of the forward portion 14, whereby rear end 18 of the rear portion 16 is radially displaced from axis 22 by a distance 36. The oblique angle 38 may vary from about 10 degrees to about 90 degrees but preferably is in a midrange between 10 and 90 degrees. The rear portion 16 comprises a fork with two side tines 16A, 16B (see FIGS. 5 and 6), separated by an inter-tine slot 72. The fish hook apparatus 10 is shown with a leader 52 with a loop end 54, for attachment to a fishing line, leader snap, or other apparatus as known in the art. The leader 52 may be resin (e.g. nylon), metal or fiber material, and is attached to the shank 12 or cap 30. In FIGS. 1–6, the leader 52 is shown passing through a leader hole 48 in cap 30 and secured around shank 12 in a knot 128. Optionally, the leader 52 may be secured to the shank 12 or cap 30 by other methods. For example, the leader 52 may be knotted below the leader hole 48, welded to the shank 12, crimped by cap 30 or otherwise attached to the shank 12.

Figure 1:
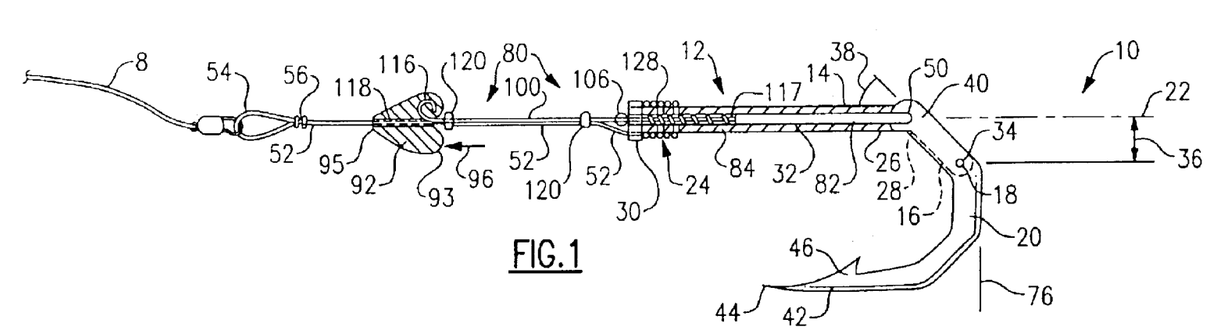
FIG. 1 is a partially sectioned side view of an exemplary embodiment of a quick-release fish hook of the present invention.

The forward portion 14 is shown with a circular cross-section, but it may differ in shape, e.g. it may be elliptical or rectangular.

Figures 2, 3:
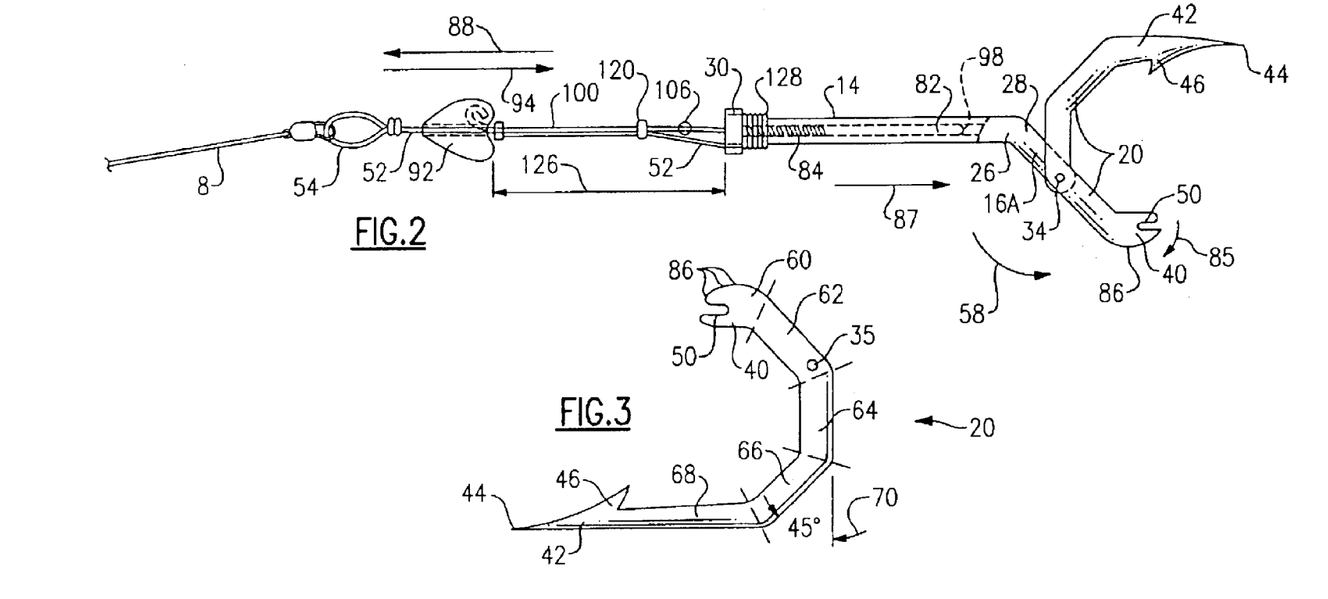
FIG. 2 is a partially sectioned side view of an exemplary embodiment of a quick-release fish hook of FIG. 1, in an opened position for fish release.
FIG. 3 is a side view of an exemplary embodiment of a swivelable hook member of a quick-release fish hook in accordance with the invention.

In FIGS. 1, 2, 3, 4, 5, 6, 7, 8, 9, 10, and 11, a generally U-shaped hook member 20 is shown with a catch end 42 having a tip 44 and a barb 46. An opposite locking end 40 has a locking notch 50 by which the hook member is locked in a closed (forwardly directed) position for fishing. The hook member 20 is shown as being rotatably mounted by swivel pin 34 in pin hole 35 to the rear shank portion 16 in slot 72, and having a portion movably enclosed in inter-tine slot 72 between tine portions 16A and 16B; thus, when unlocked, as shown in FIG. 2, the hook member may swivel in direction 58 about swivel pin 34 for at least about 150–180° to an open position where up-line tension 88 on the fishing line 8 will pull the hook tip 44 and barb 46 free from the mouth or other part of a fish.

Figure 5:
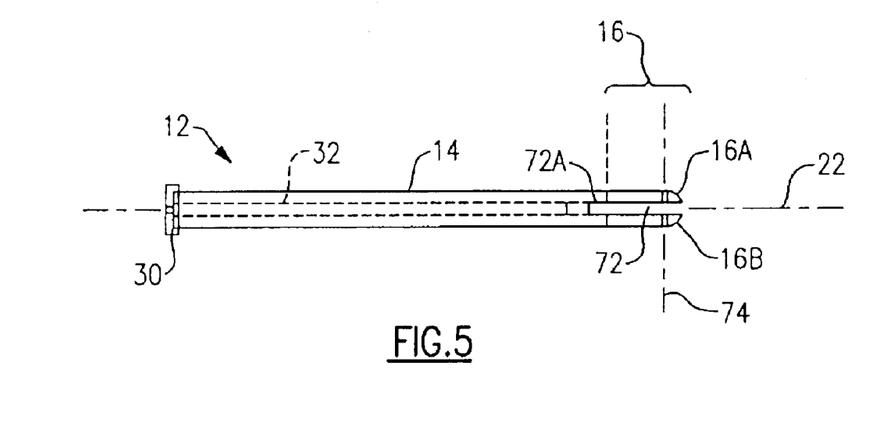
FIG. 5 is a reduced scale top view of an exemplary embodiment of a hook shank of a quick-release fish hook in accordance with the invention.

Turning to FIG. 5, it is noted that the rear portion 16 of shank 12 comprises two spaced-apart tines 16A, 16B with an intervening inter-tine slot 72. Slot 72 is shown as extending forwardly into the rear end 26 of the forward portion 14 to provide a receiving slot 72A for receiving the locking end 40 of the hook member 20 (see FIG. 1).

Figure 4:
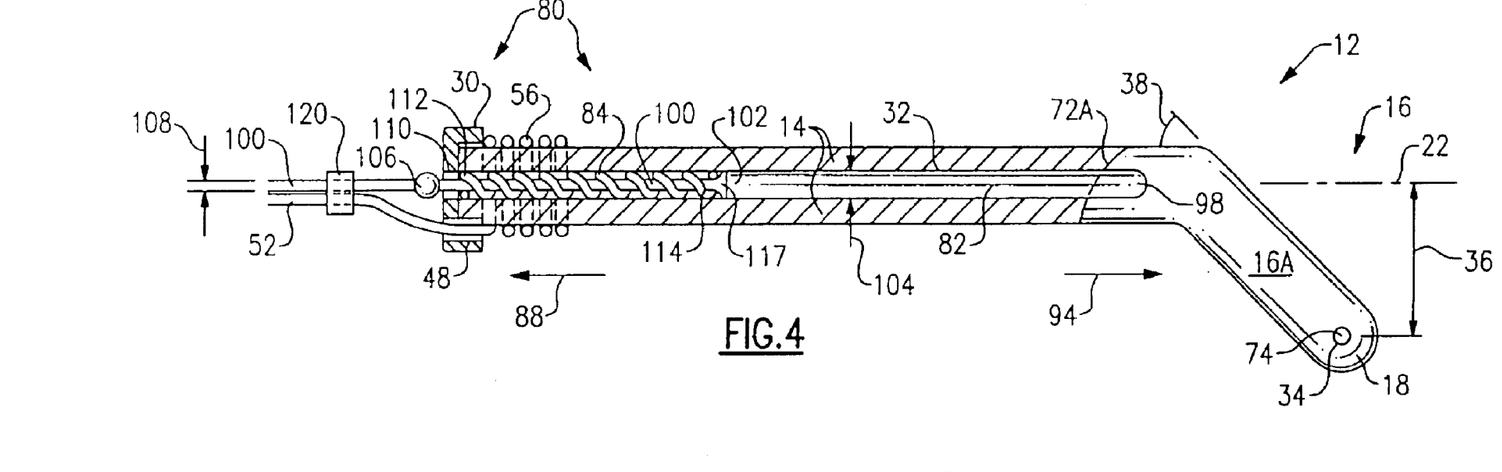
FIG. 4 is a partially sectioned side view of an exemplary embodiment of a hook shank of a quick-release fish hook in accordance with the invention.

As shown in FIG. 4, a lock/unlock assembly 80 includes a lock rod 82 which is biased to a locking, i.e. rearward position by bias spring 84 so that the lock rod 82 is forced into locking notch 50 of the hook member 20, thereby maintaining the hook member 20 in a locked position for fishing. The locking end 40 of the hook member includes not only the locking notch 50, but includes a cam surface 86 leading to notch 50. Thus, the hook member 20 is locked by simply rotation in direction 85; the cam surface 86 forces the lock rod 82 against biasing force 87 into the forward portion 14 of shank 12 until the locking notch 50 is reached. The lock rod 82, under biasing force 87, then engages the locking notch 50 and maintains the locked position until rod 82 is retracted by manual up-line force 88 on a release button 92. Preferably, the rear end 98 of lock rod 82 is rounded to ride easily on the cam surface 86. Inasmuch as a caught fish provides a down-line force 94 by its weight and struggle, the hook member 20 may be released simply by finger pressure 96 on the underside 93 of the release button 92 (see FIG. 2) to provide an up-line force 88 against the existing down-line force 94. It is not necessary for an angler to apply a down-line force 94 to the fish or hook to achieve release.

Turning now to FIG. 4, a fish hook shank 12 and a lock/unlock assembly 80 of the invention are depicted in enlarged detail. The forward portion 14 of shank 12 has a lengthwise interior channel 32 which intersects the receiving slot 72A and extends forwardly to cap 30. The bore 32 is shown as circular with a uniform diameter 104. The cap 30 is shown with a central hole 110. The lock/unlock assembly 80 is disposed within channel 32 and forwardly thereof to include release button 92. The lock/unlock assembly 80 includes a lock rod 82 whose rear end 98 is biased rearward by spring 84 to a locking position shown in FIG. 1. The front end 102 of the lock rod 82 is attached to the rear end 117 of a "ripcord" 100 of reduced diameter 108. Ripcord 100 may be formed of a strong material such as spring steel wire, monofilament nylon, etc., and acts as a smaller diameter extension of the lock rod 82. Ripcord 100 is movably passable through the ripcord hole 110 in cap 30 and extends to release button 92, to which it is fixed. The ripcord hole 110 is too small to permit passage of spring 84. Biasing coil spring 84 is mounted about the ripcord 100 within channel 32. The rear end 114 of spring 84 abuts the front end 102 of lock rod 82, and the front end 112 of spring 84 abuts cap 30, maintaining the spring in constant compression. A lock rod stop 106 is fixed to an exposed portion of ripcord 100 up-line of the cap 30, and when drawn down-line, abuts cap 30 to limit biased movement of the lock rod 82 to approximately full extension into notch 50 (see FIG. 1), or slight excess thereof. The stop 106 may comprise a bead of material fixed on the ripcord 100. In the locked position or the fully unlocked position, the biasing spring 84 retains a substantial portion of its compression, e.g. up to about one-half thereof, so that accidental unlocking will not occur. Compression retention is at least about ¼(and preferably at least about ⅓) of the compression in the compressed unlocking position.

Figures 6, 7, 8, 9, 10, 11:
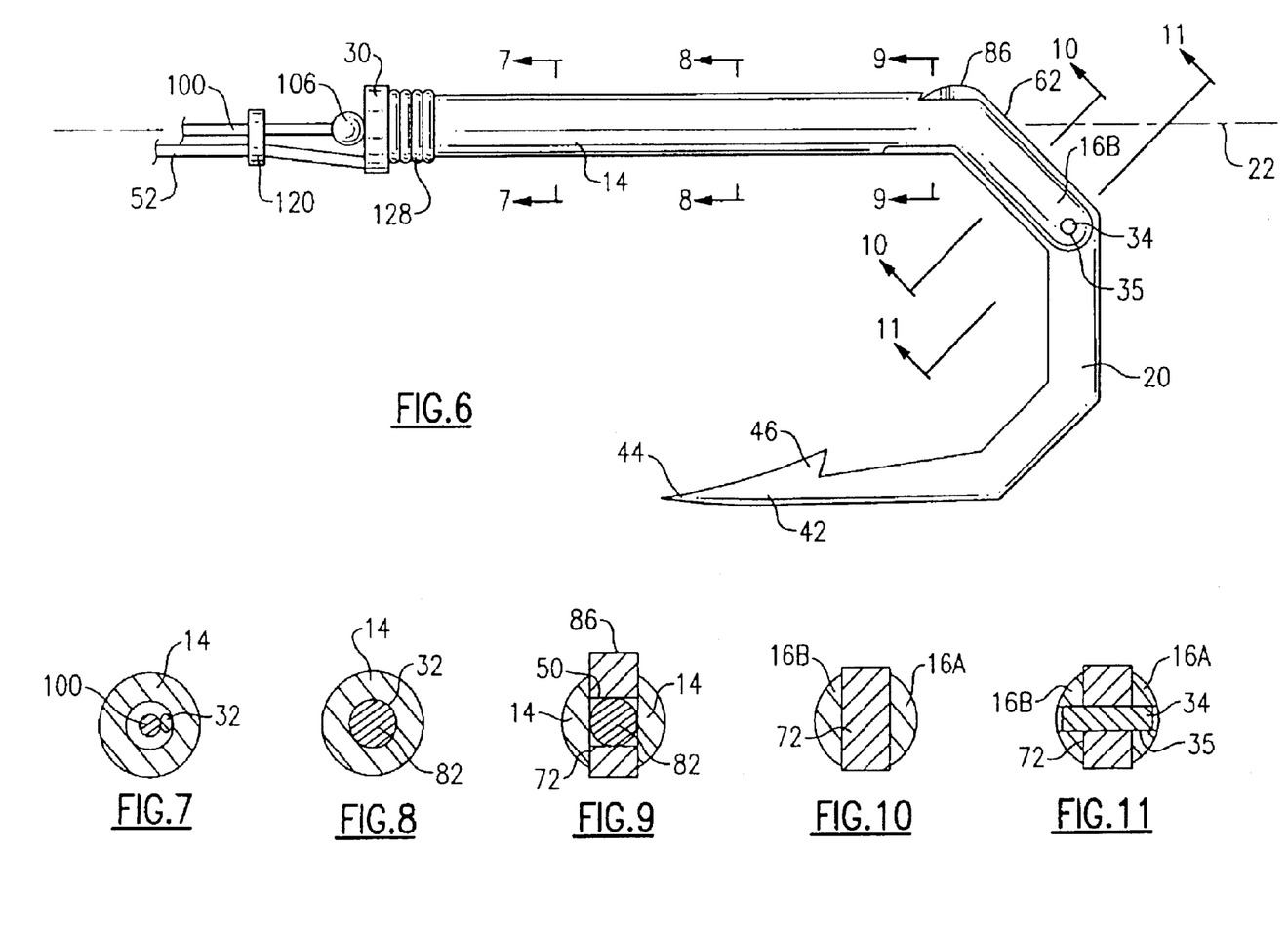
FIG. 6 is a side view of a quick-release fish hook in a locked position, in accordance with the invention.
FIG. 7 is a cross-sectional view of a shank of a quick-release fish hook in a locked position, as taken along line 7—7 of FIG. 6.
FIG. 8 is a cross-sectional view of a shank of a quick-release fish hook in a locked position, as taken along line 8—8 of FIG. 6.
FIG. 9 is a cross-sectional view of a shank and hook member of a quick-release fish hook in a locked position, as taken along line 9—9 of FIG. 6.
FIG. 10 is a cross-sectional view of a shank and hook member of a quick-release fish hook in a locked position, as taken along line 10—10 of FIG. 6.
FIG. 11 is a cross-sectional view of a shank and hook member of a quick-release fish hook in a locked position, as taken along line 11—11 of FIG. 6.

As shown in FIGS. 4 and 6, the rear shank portion 16 is angled from the front shank portion 14 to provide a desired displacement distance 36 between the swivel pin axis 74 and the longitudinal shaft axis 22. The angle 38 is shown as about 45°, but may be any angle between about 10 degrees and about 90 degrees which achieves the desired displacement distance 36 and hook shape. A leader 52 is attached to the shank 12 and is shown in these figures as a type of barrel knot 56 or other attachment.

Figure 18:
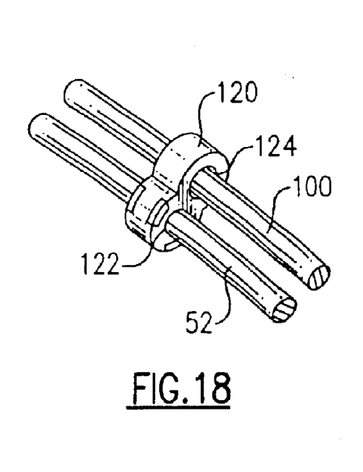
FIG. 18 is a perspective view of a leader guide with leader and ripcord of a quick-release fish hook of the invention.

As depicted in FIGS. 1 and 2, release button 92 comprises a plastic, wood or metal device to which the front end 116 of ripcord 100 is fixed. The release button 92 preferably is configured with an axial hole 118 through which the leader 52 may freely pass. The release button 92 has an underside 93 which is finger-manipulable in an up-line direction to effect hook release. The release button 92 may also be formed to act as a sinker, being made of a heavy material (e.g., lead). Alternatively, the release button 92 may be made of a lighter material and may be hollow, to provide some degree of desired floatability. The forward end 95 of button 92 is shown as stream-lined, e.g. arrow-shaped or heart-shaped to avoid hangup e.g. on weeds, branches, rocks, bottom, etc. As shown, the front end 116 of ripcord 100 may be molded into the release button 92 or attached thereto by any other effective method. Several leader guides 120 are shown fixed to leader 52 for maintaining the leader 52 and ripcord 100 in close proximity. As portrayed in FIG. 18, a leader guide 120 is shown with a leader hole 122 into which leader 52 is crimped to be immovable therethrough, and a proximate ripcord hole 124 through which the ripcord 100 may freely pass. As depicted in FIGS. 1 and 2, an exposed length 126 of ripcord 100 forward of cap 30 is provided to enable hook release without contact of an angler's hand with a fish's teeth. Length 126 will be a function of the hook size, the particular fish sought and presence of any dangerous condition, e.g. swordfish "swords" or other elongated snouts. For example, for a relatively small hook for catching bass or northern pike, a length 126 of about 6–10 inches may be adequate. For a large saltwater hook for catching large ocean fish, a required length 126 of up to about 2–4 feet or more may be useful. An appropriate number of leader guides 120 are provided to maintain the leader 52 and ripcord 100 in relatively close proximity between the cap 30 and release button 92.

Figure 3A:
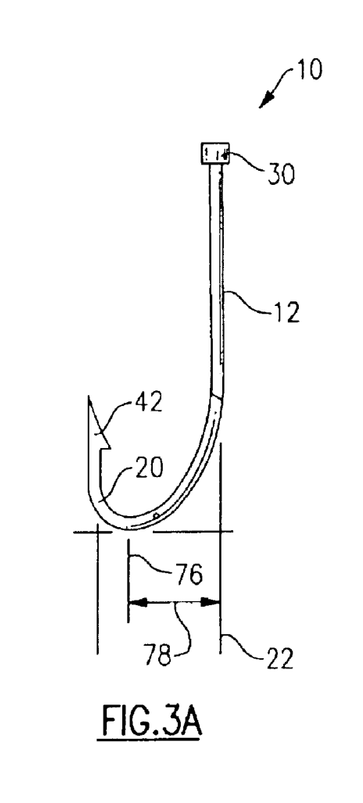
FIG. 3A is a side view of a quick-release fish hook of the invention having an alternative hook shape.
Figure 3B:
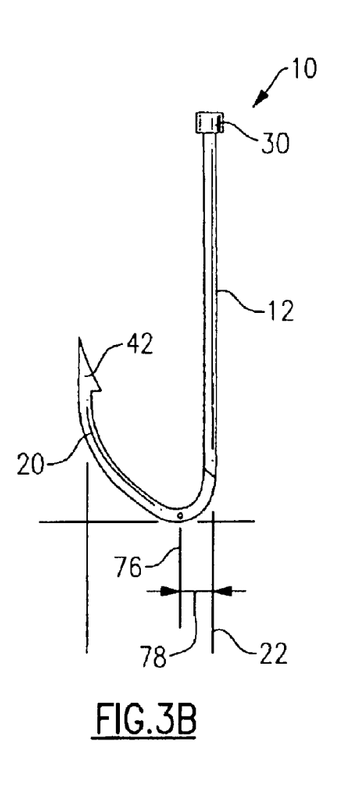
FIG. 3B is a side view of a quick-release fish hook of the invention having a further alternative hook shape.
Figure 3C:
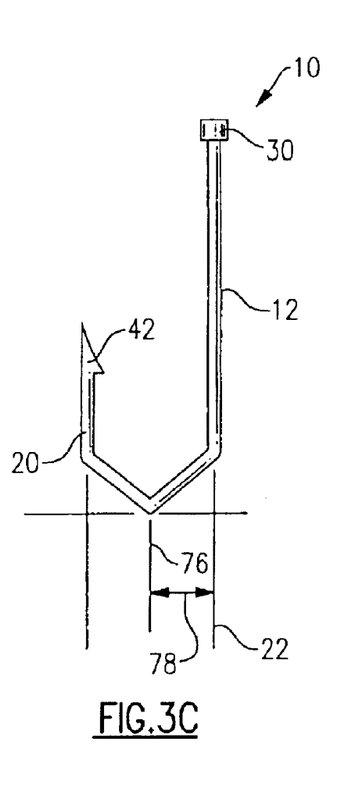
FIG. 3C is a side view of a quick-release fish hook of the invention having another alternative hook shape.

The shape of hook member 20 shown in FIGS. 1, 2, 3, 4, 5, and 6 is represented as comprising a portion of an octagon including a first side 60 with locking notch 50, second side 62, third side 64 and fourth side 66 in sequence, and a fifth side 68 having tip 44 and barb 46. The angle 70 between adjacent sides of sides 60, 62, 64, 66, and 68 is shown as being about 45 degrees, so that sides 60 and 68 are in desired opposed positions for the hook design. In this case, sides 60 and 68 are generally parallel. In other hook designs, sides 60 and 68 may be somewhat non-parallel. Furthermore, portions of or the entire hook member 20 may be substantially arcuate, with no straight sides. Swivel pin 34 is shown as passing through a swivel hole 35 in hook member 20 at a pin position i.e. axis of rotation 74 through the side tines 16A and 16B. The axis of rotation 74 is displaced from axis 22 of shank 12 by a distance 36 which may vary depending on the shape of hook member 20. The axis of rotation 74 is preferably located where the hook member passes through the perpendicular 76 to axis 22, or at a somewhat less displacement distance 36. Thus, a preferred axis of rotation 74 is located from about ½ to about 1 times the distance 78 between the perpendicular 6 and axis 22. In FIGS. 1, 2, 3 and 6, the perpendicular 76 is actually a line defining the third side 64. Unlocking of the hook member 20 results in a configuration which has no forwardly directed hook portions which may catch on weeds, stumps or other portions of a fish's mouth, etc. As depicted in FIG. 2, the unlocked hook member 20 has exposed portions which are rearwardly directed for providing an effective fish release function. FIGS. 3A, 3B and 3C show alternative hook shapes and the resulting variations in the location of perpendicular 76.

Figures 12, 13, 14:
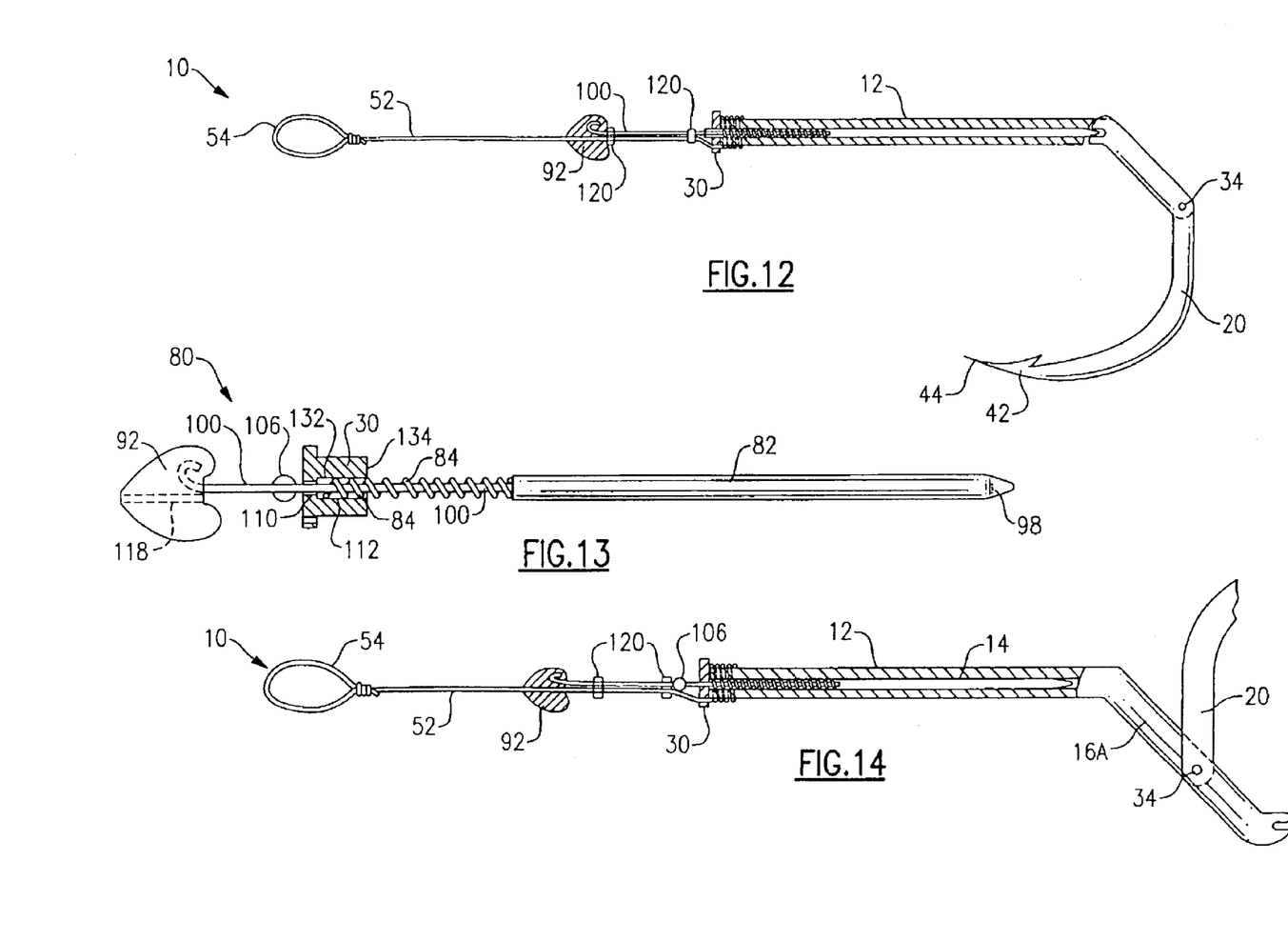
FIG. 12 is a partially sectioned side view of another exemplary embodiment of a quick-release fish hook in a locked position, in accordance with the invention.
FIG. 13 is a partially sectioned side view of another exemplary embodiment of a locking/release assembly of a quick-release fish hook in accordance with the invention.
FIG. 14 is a partially sectioned side view of another exemplary embodiment of a quick-release fish hook in a released position, in accordance with the invention.

FIGS. 12, 13, 14 and 15 illustrate another embodiment of a quick-release fish hook apparatus 10. As shown, the fish hook apparatus 10 is similar in construction and operation to that of FIG. 1, but the hook member 20 has an arcuate shape extending generally from the hook tip 44 nearly to the swivel pin 34. If desired, the entire hook member 20 may be arcuate. As depicted in FIG. 13, the cap 30 has a more elongate shape than the cap of FIG. 4, for example. The front end 112 of spring 84 extends into bore 132 in the cap 30. The ripcord hole 110 in the cap is co-axial with the cap bore 132, but of smaller diameter in order that the spring 84 will not pass through the cap but will be seated therein. The front end 28 of shank 12 will abut the rear cap surface 134. By way of contrast, in FIG. 4 as well as in FIG. 15, the spring 84 and surrounding front end 28 of the shank 12 extend together into cap 30. While it is preferable that the cap 30 is fixed to the shank 12, the apparatus will nevertheless work because the leader guide 120 nearest the cap will greatly limit movement of the cap from the shank. This is especially true where the cap is elongated to retain a greater portion of the shank therein.

Figure 15:
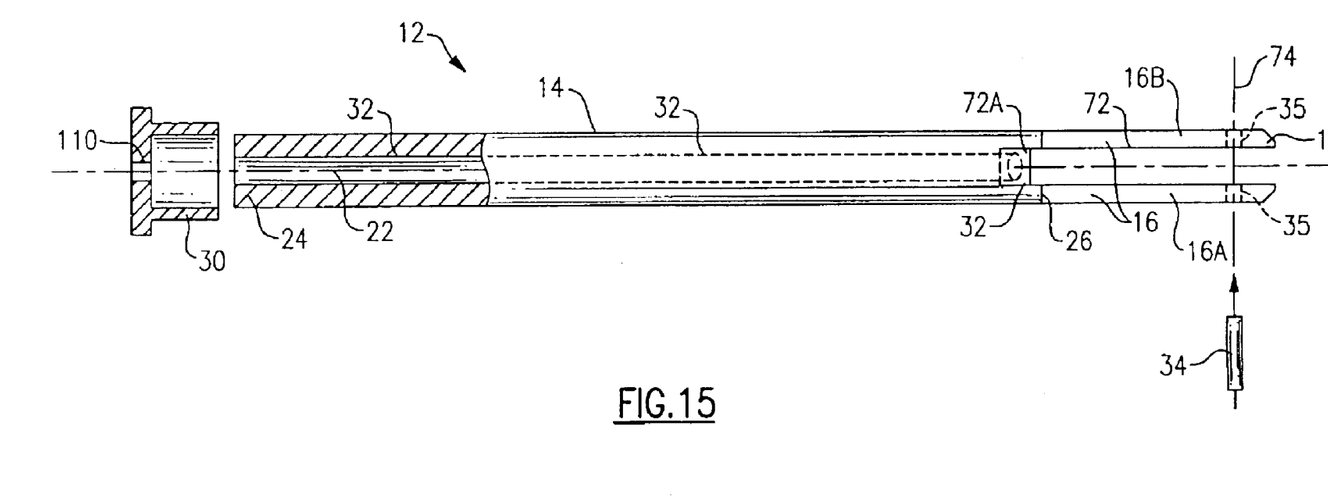
FIG. 15 is an enlarged partially sectioned bottom view of a hook shank and retainer cap of a quick-release fish hook in accordance with the invention.

Also shown in FIG. 15 is a receiving end 72A of inter-tine slot 72. The receiving end 72A and the corresponding front end 28 of hook member 20 is shaped so that rotation of hook member 20 in direction 85 (see FIG. 2) about swivel pin 34 will fully seat the locking end 40 into the receiving end 72A. During rotation, the cam surface 86 pushes the extended lock rod 82 forwardly into the channel 32 of shank portion 14 until the biased lock rod snaps into notch 50 (see FIGS. 1 and 2).

Figure 16:
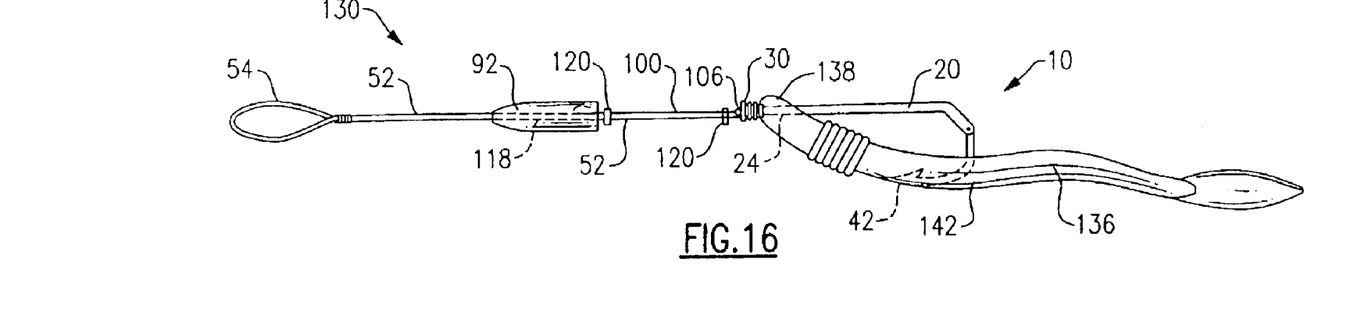
FIG. 16 is an overall side view of a quick-release fish hook of the invention used in conjunction with an artificial bait.

Turning now to FIG. 16, use of the quick-release fish hook apparatus 10 of the invention is illustrated in a so-called "Texas-rig" 130 with an artificial worm 136. Such lures are popular in fishing for freshwater bass and other game fish. As already described, the fish hook apparatus 10 includes a releaseable hook member 20 attached to a leader 52, shown here with a forward loop 54. A ripcord 100 extends forwardly from a lock rod 82 (not visible) to a release button 92 to which it is attached. The release button 92 is formed from lead or lead alloy (or other suitable non-lead alloy or metal, such as tin or bismuth, for example) to act as a "sinker". An artificial worm 136 is placed on the hook member 20 by puncturing the worm head 138 with hook end 42, moving the worm head to the forward shank end 24, and embedding hook end 42 into a central portion 142 of the worm.

Figure 17:
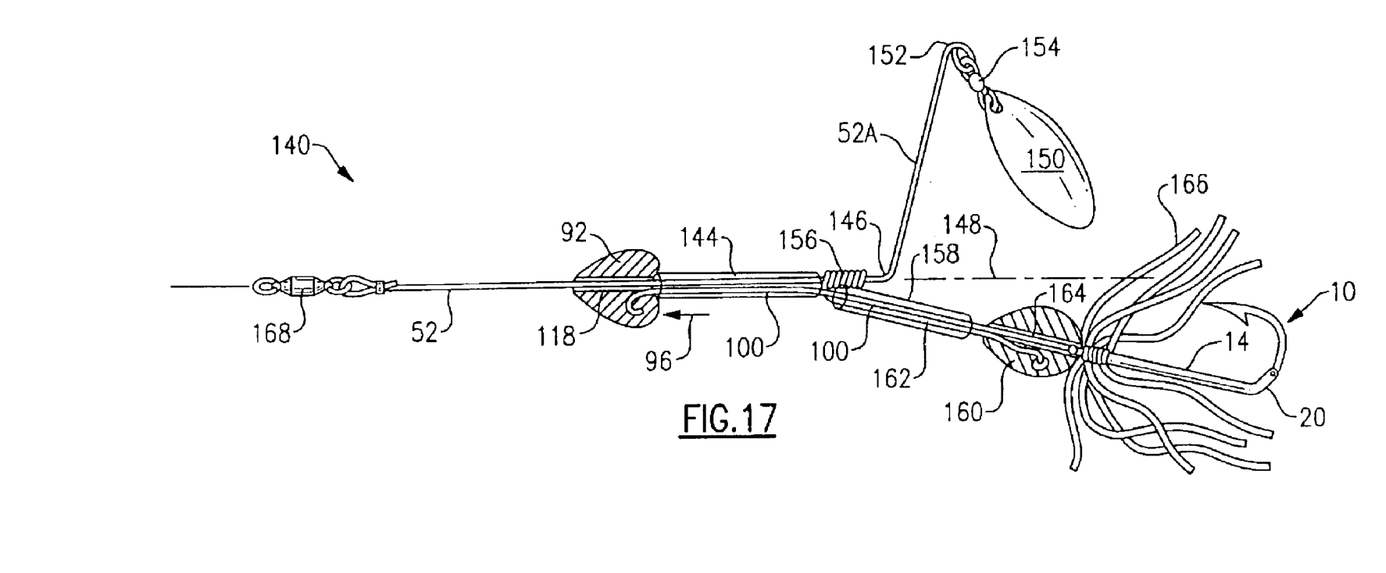
FIG. 17 is an overall side view of a further embodiment of a quick-release fish hook incorporated in a spinner-bait.

FIG. 17 depicts a quick-release fish hook apparatus 10 of the invention in a representative type of "spinner bait" lure 140, which is popular among anglers. A relatively rigid wire leader 52 is shown extending rearwardly through an axial leader hole 118 in release button 92 and through a plastic guide tube 144 to a bend 146, at which leader 52 projects away from leader axis 148 as an "outrigger" 52A for a spoon or spinner 150. Spoon/spinner 150 is shown attached to a tight end loop 152 in outrigger 52A by intervening swivel 154. A second leader 162 is attached to the wire leader 52 forward of bend 146 and is shown in FIG. 17 as a barrel knot 156. The second leader 162 passes through a second plastic guide tube 158 and is fixed in/on a lead head 160 having a leadhead aperture 164. A ripcord 100 has one end fixed in the release button 92, and extends rearwardly through the first and second plastic guide tubes 144, 158 and through aperture 164 in the leadhead 160 to a lock rod 82 (not visible) in the forward shank portion 14 of fish hook apparatus 10. As shown, rubber "legs" 166 may be attached to the forward shank portion 14 or leadhead 160 for enhancing attraction. Release of fish hook member 20 is simply accomplished by finger pressure 96, i.e. upline force on the release button 92 while a fish is hooked. The spinner bait lure 140 is shown with a swivel 168 to which an angler's leader snap (not shown) may be attached for fishing.

It is noted that the plastic guide tube 158 may be used in lieu of the leader guide 120 in any of the embodiments.

The advantages of the fish hook of the invention greatly enhance the art of sport fishing. The enhanced survival rate of fish reduces the need for planting fish, and results in an improved quality of the fish population. Ease of releasing fish and resetting the quick-release fish hook enhances the experience of fishing, particularly in so-called "catch-and-release" angling. Fishing under adverse weather or water conditions is enabled/improved by reducing the skill level and safety requirements needed for quality fishing.

For use in tournament fishing, the fish hook of the invention enables very quick fish release and hook re-setting, resulting in much more useful fishing time.

As presented in the above discussion, it is evident that the quick-release fish hook of the invention may be cooperatively utilized in a wide variety of fishing lures, including plugs, spinners, live bait rigs, rubber worm rigs, and larger flies. Furthermore, lures may be made by serially placing two or more quick-release fish hooks on a single line, and using a single ripcord to actuate the simultaneous opening (for fish release) of all hooks. The several embodiments discussed and shown in the drawings are to be considered as exemplary in all aspects and not restrictive. The scope of the invention is indicated by the appended claims, rather than by the foregoing description. All changes which come within the meaning and range of equivalency of the claims are intended to be embraced therein.

What is claimed is:

1. A quick-release fish hook, comprising:
an elongate shank comprising:
an elongate forward shank portion with:
a front end;
a rear end;
an elongate axial channel between said front and rear ends; and
a lock rod axially movable in said channel between a locking position and an unlocking position;
means for moving said lock rod to a locking position;
remote means for moving said lock rod to an unlocked position;
a rear shank portion with:
a front end;
a rear end;
swiveling means near said rear end of said rear portion;
wherein said rear shank portion projects obliquely from said forward shank portion to radially displace said swiveling means from said axial channel;
a generally U-shaped hook member rotatable about said swiveling means, and comprising:
a sharp tip end;
an opposed end;
a notch in said opposed end for lock rod insertion therein to lock said hook member in a fish-catching mode;
a cam surface adjacent said notch for forcing said lock rod toward said front end of said channel when rotatively closing said hook member to a locked position; and
means for attaching said fish hook to a fishing line.

2. A quick-release fish hook in accordance with claim 1, wherein said means for moving said lock to a locking position comprises a coil spring biased rearwardly.

3. A quick-release fish hook in accordance with claim 1, wherein said coil spring is positioned within said channel.

4. A quick-release fish hook in accordance with claim 1, wherein said rear portion comprises a pair of tines with an inter-tine sloth for rotatably holding said hook member.

5. A quick release fish hook in accordance with claim 1, wherein said hook member is rotatable about said swiveling means for at least about 150–180 degrees from said locking position to said unlocked position.

6. A quick-release fish hook in accordance with claim 2, further comprising a cap on said front end of said front portion wherein said coil spring abuts said cap.

7. A quick-release fish hook in accordance with claim 6, wherein said means for attaching said fish hook to a fishing line comprises a leader having one end attached to said cap and an opposed end formed in a knotted loop.

8. A quick-release fish hook in accordance with claim 7, further comprising a swivel attached to said knotted loop.

9. A quick-release fish hook in accordance with claim 2, wherein said spring is in constant compression.

10. A quick-release fish hook in accordance with claim 2, wherein said spring is in constant compression whereby said compression force in a locked position is more than about one-fourth of the compression force in an unlocking position.

11. A quick-release fish hook in accordance with claim 2, wherein said spring is in constant compression whereby said compression force in a locked position is more than about one-third of the compression force in an unlocking position.

12. A quick-release fish hook in accordance with claim 2, wherein said spring is in constant compression whereby compression force in a locked position is more than about one-half of the compression force in an unlocking position.

13. A quick-release fish hook in accordance with claim 1, wherein said channel is generally circular in cross-section.

14. A quick-release fish hook in accordance with claim 1, wherein said remote means comprises:
a release button up-line from said elongate shank and having a position remote therefrom;
an elongate ripcord fixed to said release button, extending into said elongate forward shank portion, and attached to said lock rod.

15. A quick-release fish hook in accordance with claim 14, wherein said ripcord passes through said coil spring in said forward shank portion.

16. A quick-release fish hook in accordance with claim 14, wherein said ripcord comprises one of metal, polymer and multi-filament material.

17. A quick-release fish hook in accordance with claim 14, wherein said release button
includes an axial hole therethrough for passage of said attaching means therethrough.

18. A quick-release fish hook in accordance with claim 14, wherein said release button is formed of a lightweight material.

19. A quick-release fish hook in accordance with claim 14, wherein said release button is formed of a heavy material to sink said fish hook.

20. A quick-release fish hook in accordance with claim 19, wherein said heavy material selected from the group comprising lead, tin, bismuth, or other non-lead alloy.

21. A quick-release fish hook in accordance with claim 14, wherein said release button is movable to an unlocked position by up-line finger pressure thereon.

22. A quick-release fish hook in accordance with claim 1, further comprising means for limiting movement of said lock rod.

23. A quick-release fish hook in accordance with claim 22, wherein said means for limiting movement of said lock rod comprises a stop bead fixed to said ripcord up-line of said forward portion.

24. A quick-release fish hook in accordance with claim 1, wherein said elongate shank has a generally circular cross-section.

25. A quick-release fish hook in accordance with claim 1, wherein said elongate shank has a generally elliptical cross-section.

26. A quick-release fish hook in accordance with claim 1, wherein said elongate shank has a generally rectangular cross-section.

27. A quick-release fish hook in accordance with claim 1, wherein said fish hook is attached to a body of a fish attraction lure.

28. A quick-release fish hook in accordance with claim 1, wherein said fish hook is part of a "Texas Rig" lure on which an artificial worm is mounted.

29. A quick-release fish hook in accordance with claim 1, wherein said fish hook is part of a spinner-bait lure.

30. A quick-release fish hook in accordance with claim 1, wherein a plurality of said fish hooks are serially attached to a single fishing line and configured to be simultaneously opened to a released position by actuation of a single ripcord.

* * * * *